(12) United States Patent
Higgins et al.

(10) Patent No.: US 6,961,703 B1
(45) Date of Patent: Nov. 1, 2005

(54) METHOD FOR SPEECH PROCESSING INVOLVING WHOLE-UTTERANCE MODELING

(75) Inventors: Alan Lawrence Higgins, Poway, CA (US); Lawrence George Bahler, San Diego, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 767 days.

(21) Appl. No.: 09/660,635

(22) Filed: Sep. 13, 2000

(51) Int. Cl.[7] .......................... G10L 17/00; G10L 15/06
(52) U.S. Cl. ..................... 704/249; 704/246; 704/243; 704/256.1
(58) Field of Search ............................... 704/256, 246, 704/243, 254, 255, 247, 249–251

(56) References Cited

U.S. PATENT DOCUMENTS

| | | | |
|---|---|---|---|
| 4,720,863 A | | 1/1988 | Li et al. |
| 4,837,830 A | | 6/1989 | Wrench, Jr. et al. |
| 5,339,385 A | | 8/1994 | Higgins |
| 5,414,755 A | | 5/1995 | Bahler et al. |
| 5,526,465 A | * | 6/1996 | Carey et al. ................. 704/250 |
| 5,613,037 A | * | 3/1997 | Sukkar ........................ 704/256 |
| 5,687,287 A | * | 11/1997 | Gandhi et al. .............. 704/247 |
| 5,754,977 A | * | 5/1998 | Gardner et al. ............. 704/243 |
| 5,806,034 A | * | 9/1998 | Naylor et al. ............... 704/256 |
| 5,832,063 A | * | 11/1998 | Vysotsky et al. ........ 379/88.03 |
| 5,835,890 A | * | 11/1998 | Matsui et al. ............... 704/255 |
| 5,873,061 A | * | 2/1999 | Hab-Umbach et al. ..... 704/254 |
| 5,960,399 A | * | 9/1999 | Barclay et al. .......... 704/270.1 |
| 5,983,178 A | * | 11/1999 | Naito et al. ................. 704/245 |
| 6,343,267 B1 | * | 1/2002 | Kuhn et al. ................. 704/222 |

OTHER PUBLICATIONS

"On the Application of Vector Quantization and Hidden Markov Models to Speaker-Independent, Isolated Word Recognition", by L.R. Rabiner et al., published in the Bell System Technical Journal, vol. 62, No. 4, pp. 1075-1105, Apr. 1993.

"Recognition in Face Space", by Matthew A. Turk and Alex P. Pentland, published in Automatic Recognition of Objects (SPIE Milestones), pp. 3-11, 1990.

"The Use of Multiple Measurements in Taxonomic Problems", by R.A. Fisher, pp. 32.178a-32.188, reprinted from Annals of Eugenics, vol. VII, Part II, pp. 179-188, 1936.

(Continued)

*Primary Examiner*—David L. Ometz
*Assistant Examiner*—James S. Wozniak
(74) *Attorney, Agent, or Firm*—RatnerPrestia

(57) ABSTRACT

A speech verification process involves comparison of enrollment and test speech data and an improved method of comparing the data is disclosed, wherein segmented frames of speech are analyzed jointly, rather than independently. The enrollment and test speech are both subjected to a feature extraction process to derive fixed-length feature vectors, and the feature vectors are compared, using a linear discriminant analysis and having no dependence upon the order of the words spoken or the speaking rate. The discriminant analysis is made possible, despite a relatively high dimensionality of the feature vectors, by a mathematical procedure provided for finding an eigenvector to simultaneously diagonalize the between-speaker and between-channel covariances of the enrollment and test data.

7 Claims, 3 Drawing Sheets

(Comparison Example)

OTHER PUBLICATIONS

*Pattern Classification and Scene Analysis*, by Richard O. Duda and Peter E. Hart, Part I, Section 4.10, "Fisher's Linear Discriminant", pp. 114-118, 1973.

"An Inequality and Associated Maximization Technique in Statistical Estimation for Probabilistic Functions of Markov Processes", by Leonard E. Baum, pp. 1-8, published in Inequalities, vol. 3, No. 1, 1972.

"Maximum Likelihood from Incomplete Data via the EM Algorithm", by A.P. Dempster et al., pp. 1-38, published in J. Royal Statistics Society, vol. 39, 1977.

*VLSI Signal Processing*, chapter 9 entitled, "Real Time Speech Processing", pp. 308-315, 316-327 and 329-348, published by the IEEE Press, 1984.

* cited by examiner (Feature Extraction Process)

(Comparison Method)

(Comparison Example)

METHOD FOR SPEECH PROCESSING INVOLVING WHOLE-UTTERANCE MODELING

FIELD OF THE INVENTION

This invention relates to methods of automated speech processing. With the method of this invention, segments of speech utterances, known as frames, are analyzed jointly, rather than independently as has been done with previous methods. The invention is particularly useful for systems involving speaker or speech verification.

BACKGROUND OF THE INVENTION

People have been interested in analyzing and simulating the human voice since ancient times. Recently, interest in speech processing has grown with modern communication systems. Improved methods of speech processing can provide us with more sophisticated means for recording, securing, transporting, and imparting information. To illustrate, modern communications systems could include talking computers, information systems secured with a voiceprint password, and typing machines that receive data through voice input (as opposed to manual or keyed input). Voiceprints can be used to control access to protected services, such as phone cards, voice mail, customer accounts, and cellular service. See, for example, U.S. Pat. No. 5,414,755, issued to Lawrence G. Bahler on May 9, 1995, et al., entitled SYSTEM AND METHOD FOR PASSIVE VOICE VERIFICATION IN A TELEPHONE NETWORK, and assigned to ITT Corporation, the assignee herein, which discloses the use of speaker verification in connection with long-distance telephone services.

Automated speech processing may take many forms. For example, speech can be input into a device to (1) confirm or verify the identity of the speaker (known as speaker verification); (2) identify an unknown talker (speaker recognition); (3) convert what the speaker says into a graphical representation (speech recognition); (4) translate the substance of what the speaker has said, or have the device respond to the speaker's utterances (speech understanding); or (5) determine whether specific subjects were discussed or words uttered (word spotting). The method of this invention is particularly useful with regard to the first of these methods, namely, speaker verification, although it is contemplated that it could be applied to other methods as well.

In speaker verification, generally "reference patterns" or Models of the speech phenomenon to be recognized are developed. The Models are then compared to subsequently obtained speech samples (which may be unknown). In previous methods, both the Models and unknown speech samples have been analyzed by dividing the speech utterances into short segments of speech called frames. Previous methods analyze the frames separately and then combine the results under the assumption that the frames are statistically independent.

Methods for measuring speech across spectral bands and for comparing models of speech are well known. Speech, when uttered, produces an acoustic waveform which can be measured as a function of frequency, time, and intensity. A typical speech analyzer consists of a series of band pass filters which are otherwise arranged in a set which covers all the frequencies of the speech spectrum (typically from 50–10,000 Hz). The response frequency characteristics of a good band pass filter set are well known. These band pass filters are operated over the entire speech band and have fixed band widths over a given frequency range. Automatic switching of a level indicator or other device to each of the filter outputs in a frequency sequence can give one an octave spectrum plot of all the frequencies. When the sequence is rapidly cycled, one can monitor time variations of the spectrum. Hence, spectrographs of speech waves can be produced. In speaker verification systems, the analog waveform of the speaker's voice is converted to digital form. This is done for both the reference Models developed from enrollment data and for the speech samples developed from test data. Computer processing is then applied to measure the Euclidean distance between the reference Models and the speech samples, which may be determined by applying a linear discriminant function (LDF), i.e., Fisher's LDF, which is well known and described in the literature. See for example an article entitled, "The use of multiple measurements in taxonomic problems" by R. A. Fisher published in Contributions to Mathematical Statistics (John Wiley, N.Y.) (1950). See also "Pattern Classification & Science Analysis" pp. 114–114 by R. O. Duda, P. E. Hart published (Wiley, N.Y.) (1973). If the distance measured is less than a predetermined value, or in other words produces a certain "score," a decision is made to accept or reject the test data as having been uttered by the same person providing the enrollment data.

To date, however, voice verification methods have divided the speech utterances into frames and analyzed the frames separately. The results are then combined with the assumption that the frames are statistically independent. For general background regarding speech verification systems and the use of frames of speech data, see for example, U.S. Pat. No. 5,339,385, issued to Alan L. Higgins, the inventor herein, on Aug. 16, 1994, entitled SPEAKER VERIFIER USING NEAREST-NEIGHBOR DISTANCE MEASURE; U.S. Pat. No. 4,720,863 issued to Kung-Pu Li on Jan. 19, 1988, entitled METHOD AND APPARATUS FOR TEXT-INDEPENDENT SPEAKER RECOGNITION; and U.S. Pat. No. 4,837,830, issued to Wrench, Jr. on Jun. 6, 1989, entitled MULTIPLE PARAMETER SPEAKER RECOGNITION SYSTEM AND METHODS. Each of these three patents were assigned to ITT Corporation, the assignee herein, and they are hereby incorporated by reference.

The independence assumption in analyzing speech frames as used in previous methods is a mathematical convenience; however, it is incorrect, because the frames of a speech utterance are shaped by the mechanical characteristics and constraints of the speech production mechanism, which remains constant throughout the utterance. In addition, noise and distortions may be added to the speech as it is being measured. Often, these artifacts remain steady over time (e.g. electrical "hum"), adding to the correlation between measured frames. The independence assumption causes these correlated effects to be "counted" as new information at each frame, overstating their true information content, and creating undue sensitivity of the verifier.

An object of this invention is, therefore, to provide a method for analyzing speech frames jointly without assuming independence to increase the accuracy of the speech processing. The invention herein is superior to previous methods because it frees the analysis of the faulty independence assumption.

SUMMARY OF THE INVENTION

The method of the present invention comprises a comparison of enrollment data with test data. The person whose voice is being tested is asked to speak one or more of the phrases, selected by the verifier, to obtain enrollment data. To perform the speech verification, the enrollment data spoken previously by the claimed speaker is compared with test data subsequently obtained. In making this comparison, the spoken words are converted into speech vectors, preferably using a vocabulary of five words, and a feature extraction process is performed on the data to derive a fixed-length feature vector that is independent of the order of the words spoken and the speaking rate.

A decision to accept or reject the test data as reflecting an utterance by the same person who gave the enrollment data is reached by comparing the test and enrollment feature vectors. The feature vectors are compared using Fisher's linear discriminant function (LDF). The dimensionality of the feature vectors may be very high (e.g. 1000 to 2000), and thus, under previously known means, estimation of Fisher's LDF would be impractical. However, the invention overcomes this problem by providing a method of estimating Fisher's LDF for feature vectors of arbitrarily high dimensionality. A new mathematical formula is providing for generating an eigenvector, E, that simultaneously diagonalizes the covariances in between-speaker and between-channel spaces and finds the independent amounts of discrimination.

BRIEF DESCRIPTION OF THE DRAWINGS

For the purpose of illustrating the invention, there is shown in the figures the steps of the present invention as is presently preferred, it being understood, however, that this invention is not limited to the precise methods illustrated.

DETAILED DESCRIPTION OF THE INVENTION

Figure 1:
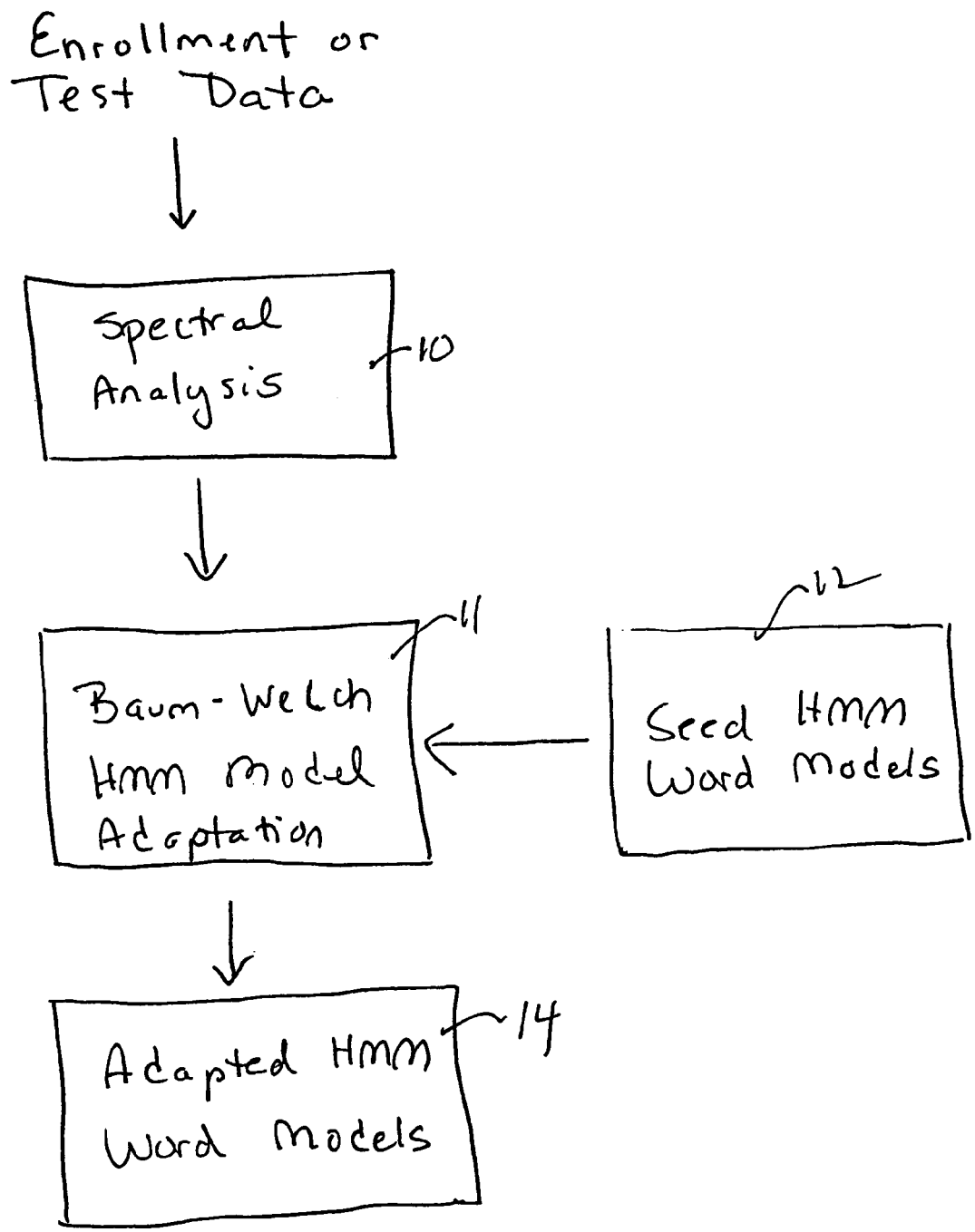
FIG. 1 is a model diagram showing the steps of the feature extraction process of the present invention method.
Figure 2:
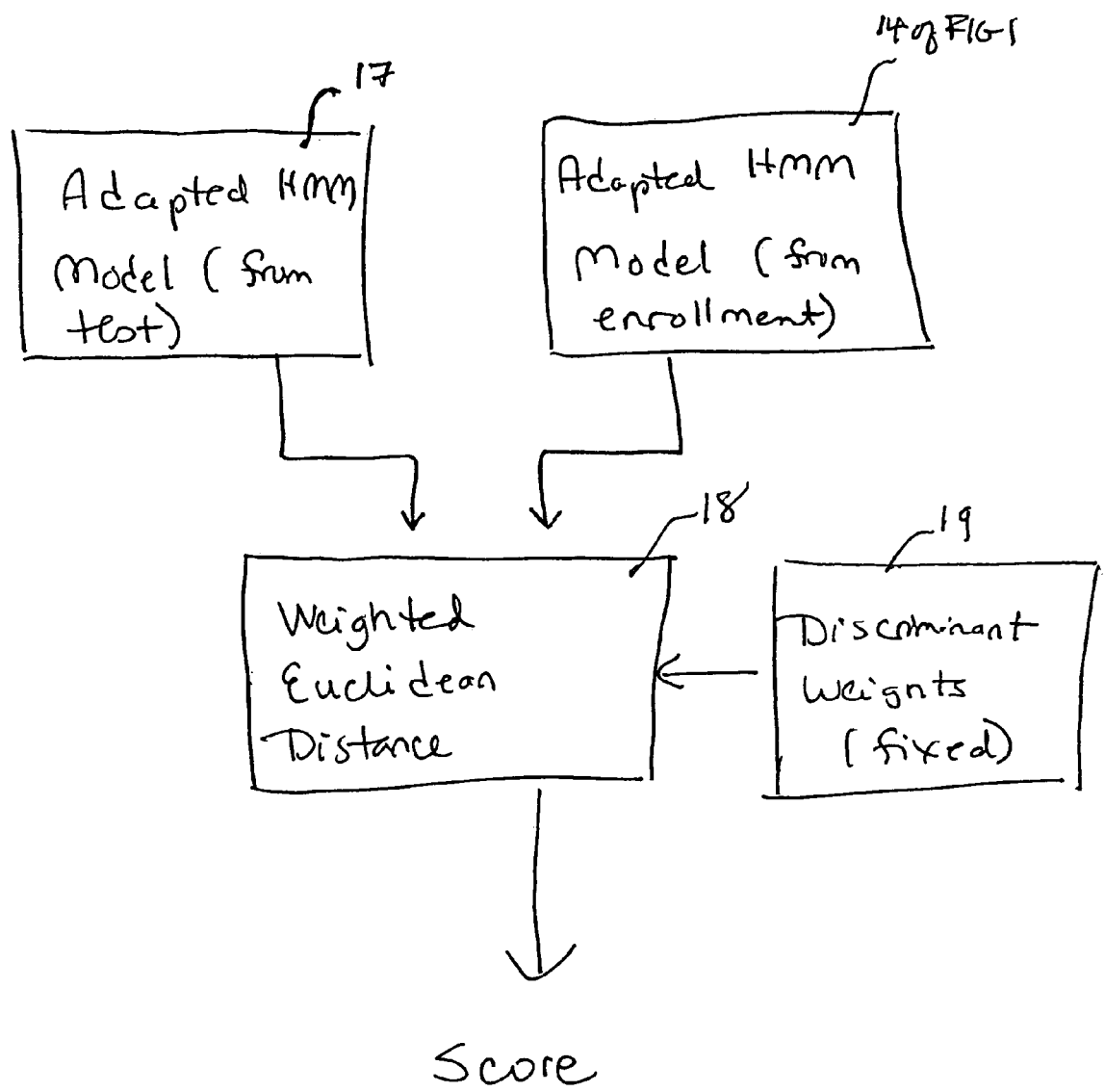
FIG. 2 is a model diagram showing the steps of comparing the enrollment and test feature vectors of the present invention method.
Figure 3:
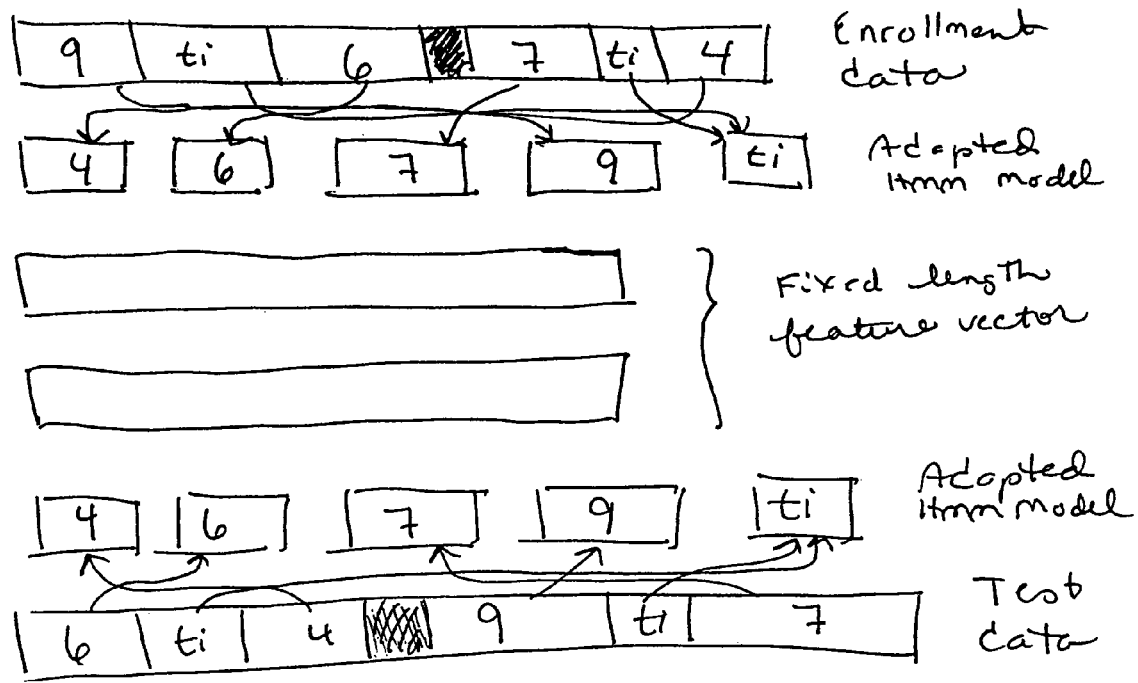
FIG. 3 is a diagram further illustrating the comparison of the enrollment and test feature vector, despite differences in the order of the words spoken, of the present invention method.

The present invention method is applicable to verifying whether test data, given by an unknown speaker, is provided by the same speaker who previously provided enrollment data (a known speaker). Therefore, enrollment data and test data must be obtained. Next, as shown in FIGS. 1 and 3 and further described below, a feature extraction process is performed on both the enrollment and the test data; in a preferred embodiment, this process is applied to derive adapted hidden Markov (HMM) Models based on a vocabulary of five words. As shown in FIG. 2 and further described below, the adapted HMM Models are then compared. The similarity between the enrollment and the test data is measured by computing a weighted Euclidean distance between the adapted Models obtained from the enrollment data and the test data. The weighting of the Euclidean distance is determined by discriminant analysis.

Under prior art methods, the discriminant analysis would not be practical with the method of this invention; with the five word vocabulary used here to derive the adapted HMM Models, the total dimensionality of the feature vector equals 1568, and under prior methods, discriminant analysis can only be applied in practice when the dimensionality is on the order of 200–300 or less. Therefore, a new mathematical formula is provided to estimate the linear discriminant function for feature vectors of high dimensionality. Each of these steps of the present invention method are described in further detail below.

Feature Extraction

Once the enrollment or test speech in put data is obtained, the feature extraction process is applied to obtained adapted word models for comparison. The spoken text is converted into speech vectors. In the preferred embodiment, a vocabulary of five words is used in developing the models: "four", "six", "seven", "nine", and "ti." These words are combined to form number-pair phrases, such as "64-97" (six ti four, nine ti seven), or "96-74" (nine ti six, seven ti four). Each number-pair phrase contains all five words. It is understood, however, that other vocabularies may be used in performing the method of this invention.

The feature extraction process adapts the parameters of a set of word models for the five vocabulary words, based on the observed input speech data. The feature extraction process is shown in FIG. 1. As illustrated in FIG. 1, the models are hidden Markov (HMM) models, which are well known and described in the literature. The "seed" models from which adaptation occurs are derived over a large population of speakers. Adaptation is accomplished using a single pass of the Baum-Welch algorithm, which is also well-known. See "on inequality & associated maximization technique is statistical estimation of probabilistic functions of Markow processes" by L. E. Baum published in Inequalites v. 3, no. 1, pp. 1–8, (1972). See also "Maximum Likelihood from incomplete data via the EM algorithm" by A. P. Pempster, N. M. Laird, D. B. Rubin published in the J. Royal Statistics Society, v. 39, pp. 1–38 (1977).

Referring to FIG. 1 there is shown a block diagram depicting the feature extraction process. Enrollment or test data is implemented by means of a speaker together with a microphone whereby the speech undergoes a spectral analysis in module 10. Spectral analysis of speech including the breaking up of speech into various frequency components and converting those components into suitable digital signals or otherwise is well-known. There are many techniques for performing this. There are also integrated circuits which will process speech in regard to different variations. See for example, a text entitled *VLSI Signal Processing*, published by the IEEE Press, 1984; see chapter 9 entitled *Real Time Speech Processing*. This chapter describes various integrated circuits or other circuitry which automatically processes speech in regard to the spectral analysis.

The analyzed speech is applied to one input of a module 11 whereby a Baum-Welch HMM model adaptation is performed. Actually, the model adaptation is performed using seed HMM word models which are stored in the memory bank designated by module 12. These seed HMM word models are compared with the spectral analyzed speech and to produce at the output adapted HMM word models. These models have been adapted from the seed models in memory 12 via the Baum-Welch algorithm to produce the adapted HMM word models. It is noted that the HMM technique which is hidden Markov models, is quite well known in speaker recognition system. See, for example, an article entitled *On the Application of Vector Quantization and Hidden Markov Models to Speaker Independent Isolated Word Recognitions*, published in the *Bell System Technical Journal*, Vol. 62, No. 4, pages 1075–1105, April 1993. The use of the hidden Markov model (HMM) is quite well known in speech processing.

The feature vector is created by concatenating the state-mean vectors of the adapted HMM word models. In the preferred embodiment, the words "four", "six", "seven", and "nine" each have 25 states, and "ti" has 12 states. The total number of states therefore equals 112. Within each word, states appear in a temporal order. The words appear in the following order: "four", "six", "seven", "nine", "ti". The mean vector corresponding to each state consists of 14 numbers representing an average sound spectrum. The total dimensionality of the feature vector equals 14×112=1568.

Voice Comparison

Comparison of a voice collected during an enrollment session with a voice collected during a test session is accomplished using the procedure shown in FIG. 2. A weighted Euclidean distance is computed between the feature vectors, where the weighting is determined by discriminant analysis, as discussed below. The weighting factors are fixed, not dependent on the identity of the claimant. The resulting weighted Euclidean distance is treated as a score by which the dissimilarity between the enrollment data and the test data is measured.

Referring to FIG. 2, there is shown a block diagram showing the formation of a score according to an aspect of this invention. As seen, the adapted HMM model, which are obtained from enrollment, as described above and as indicated in FIG. 1, are provided by module 14 of FIG. 1. The output of that module is applied to one input of module 18 which is a weighted Euclidean distance estimator. Another input to module 18 is from the adapted HMM model which output results from test speech. It is understood that the model implementation of module 17 does not utilize the same enrollment terms as described above for model 14, but is arbitrary test data. The two models which are formed may be speaker dependent and are compared by a weighted Euclidean distance in module 18 which relies on discriminant weights obtained from a memory or module 19. The weighting factors from module 19 are fixed and are not dependent upon the identity of the speaker. The use of the Euclidean distance to determine score is well known and reference is made to the above-noted patents.

FIG. 3 further illustrates the feature extraction process and comparison of the enrollment data and test data. As shown in FIG. 3, the enrollment utterance, "96-74", is converted by means of the Baum-Welch algorithm to a set of adapted HMM word models. The word models are laid out in the designated order ("four", "six", "seven", "nine", "ti"), and the state mean vectors are concatenated to form the feature vector. The same procedure is performed for the test utterance, "64-97". Accordingly, the two vectors can be directly compared, using weighted Euclidean distance, despite differences in the order of words spoken or differences in the speaking rate between the two utterances. The comparison is possible because the feature extraction process converts the variable input to a fixed-format feature vector.

Discriminant Analysis

Discriminant analysis requires separate data sets containing within-speaker variations (variations observed between different sessions involving the same speaker), and between-speaker variations (variations observed between different sessions involving different speakers). It is believed that the largest source of within-speaker variation is the channel-to-channel variations that are observed between separate sessions in which the same speaker uses different microphones or telephone handsets. Channel variation is acquired explicitly by collecting data for many speakers, each over a pair of channels. A feature vector difference is formed for each channel pair, keeping the speaker fixed. Within-speaker variation is modeled using the collection of these feature vector differences. Similarly, between-speaker variation is modeled as a collection of differences between feature vectors of different speakers. An analysis that can also be employed which is different from discriminant analysis is referred to as "eigenfaces." This concerns a statistical analysis developed for recognition of human faces. This innovation provides a mathematically correct computational "shortcut" enabling a statistical technique to be applied to data a very high dimensionality. Analogously, the current technique is a mathematically correct computational shortcut that enables discriminant analysis to be applied to data of very high dimensionality. See "Recognition in Face Space" published in Automatic Recognition of objects (SPIE Milestones) (1990) by M. Turk and A. Pentland.

Measurement Dimensionality

The mathematical equations from the prior art that allow us to solve for the discriminant transformation can only be applied in practice when measurement dimensionality is on the order of 200–300 or less. Insufficient computational precision prevents application to measurements of higher dimensionality. In the preferred embodiment of the invention, measurement dimensionality is 1568. A new mathematical procedure is derived to enable the discriminant analysis in light of this higher dimensionality. The resulting mathematical equations can be described as having the following properties:

1. Because the data does not fill the dimensionality, a subspace is chosen upon which to allow matrix inversions. That chosen subspace is the subspace upon which the observed between-speaker variations lie. The distinctions between speakers are retained by projecting the data onto that subspace.

2. The entire eigenvector problem is transformed into the dual space of model-to-model closenesses. This reformulates the problem in a lower dimensional space, with dimensionality equal to the number of tokens that would have gone into the estimation of the covariance, rather than the original, higher dimensionality of the measurement space.

3. The covariances estimated are in fact covariances of differences between models. As differences are used, the assumption of zero mean is assumed. The sought transformations are linear, Not affine. Because the transformation is linear and not affine, it precludes the possibility of estimating the amount of mean channel difference and subtracting it off, resulting in a lower channel variation residual that would be found projected into the speaker distinctions space.

The squared deviation in each new dimension is weighted by the square root of the constructed discrimination variance. One theoretically pleasing interpretation implies that the new dimensions are being weighted as a matched filter for speaker differences in a space transformed so that the noise on speaker differences due to channel differences is made white.

Mathematical Derivation of Discriminant Transformation

Mathematically, the problem can be stated as finding a set of eigenvectors, E, upon which data projects into statistically independent dimensions:

$$BE = WED \qquad (1)$$

where B and W are covariance matrices, computed for data that represents the between-speaker differences and the within channel differences, respectively.

The E is a sought, orthonormal transformation that diagonalizes the B and W spaces and finds the independent amounts of discrimination as D. The problem as posed would be straightforward if there were enough data to estimate the covariance matrices and the dimensionality were small enough to fit in the computer's space and time constraints. We have solved the eigen-equation under a projection on the space of B. It is believed that this space retains most of the useful information.

We define B as $AA^T$, where A is the stacking of tokens of between-speaker data. We define W as $VV^T$ where V is the stacking of tokens of between-channel data. We consider the data as lying in a measurement space of high dimensionality, for example 1582 dimensions, which represent an entire model for a speaker, where 112 states each have 14 parameters.

The dimensionality of A is then 1582 $xn_A$, where $n_A$ is the number of tokens going into the estimation of B. A scale of $1/n_A$ is imposed on each vector in A, so that the product summed becomes an average. Similarly, V is defined as scaled token that construct W.

We define F and G as the eigenvectors and eigenvalues of the following equation:

$$A^T A F = F G \quad (2)$$

where $F^T F = I$ (identity matrix) and G is diagonal. We find that the solution, E, can be found by constructing $$E = A F G^{-1} H \quad (3)$$

where H will be the eigenvector solution of $$CH = HD^{-1} \quad (4)$$

where $C = G^{-1} F^T A^T V V^T A F G^{-1}$.

The construction of this latter eigenvector equation from the previous definitions follows:

$$AA^T E = VV^T E D \quad (5)$$

is the originally stated problem. The solution is ill-conditioned so we propose to keep only that solution that projects on the space of B. This is accomplished by pre-multiplying equation (5) by $A^T$.

$$A^T A A^T E = A^T V V^T E D \quad (6)$$

This is the projected problem. Substituting (3) into (6) gives $$A^T A A^T A F G^{-1} H = A^T V V^T A F G^{-1} H D \quad (7)$$

Simplifying the left hand side of (7), using (2) gives $$FGH = A^T V V^T A F G^{-1} H D \quad (8)$$

Pre-multiplying both sides by $G^{-1} F^T$, and post-multiplying by $D^{-1}$, $$HD^{-1} = G^{-1} F^T A^T V V^T A F G^{-1} H \quad (9)$$

Defining the symmetric matrix C as $$C = G^{-1} F^T A^T V V^T A F G^{-1} \quad (10)$$

Makes (9) into a standard eigenvector equation:

$$CH = HD^{-1} \quad (11)$$

Where $H^T H = I$, and $D^{-1}$ is diagonal. Care must be taken in that the inverse discriminative values are solved in this latter eigenvector equation.

The present invention may be embodied in other specific forms or by applying other specific steps without departing from the spirit or essential attributes therefor. Accordingly, reference should be made to appended claims, rather than to the foregoing specification, as indicating the scope of the invention.

What is claimed is:

1. A method of speaker verification by matching a claimed speaker with a known speaker, including the steps of processing spoken input enrollment speech data and test speech data, generating respective match scores therefrom, and determining whether the test speech data corresponds with the enrollment speech data, the method comprising:

forming enrollment speech data as a first plurality of pair-phrases using a set of words, the set of words consisting of a predetermined number of words, wherein the set of words are words between one to nine and at least one bridging word "ti";

forming test speech data as a second plurality of pair-phrases from the same set of words, the second plurality of pair-phrases different from the first plurality of pair-phrases;

converting, by a Baum-Welch algorithm, the first plurality of pair-phrases into a first set of adapted HMM word models;

converting, by the Baum-Welch algorithm, the second plurality of pair-phrases into a second set of adapted HMM word models;

ordering the first set of adapted HMM word models into a first sequence;

ordering the second set of adapted HMM word models into a second sequence, the second sequence and the first sequence having the same order and the same predetermined number of words; and comparing the first and second sets of adapted HMM word models using a weighted Euclidean distance.

2. A method of speaker verification according to claim 1, wherein the predetermined number of words comprise five words, namely, "four", "six", "seven", "nine", and "ti".

3. A method of speaker verification according to claim 1, wherein enrollment and test feature vectors are created by concatenating state-mean vectors of the first and second sets of the adapted HMM word models.

4. The method according to claim 3 including the further step of:

comparing said enrollment feature vector obtained from said enrollment with the test feature vector obtained from a speech test to determine the identity of a test speaker voice.

5. The method according to claim 3 wherein said enrollment feature vector has a total dimensionality of 1568.

6. The method according to claim 3 further including the step of:

forming said enrollment feature vector for each known speaker using the difference in vectors between a first and second speaker channel.

7. The method according to claim 6 wherein each speaker vector approximates speaker speech with white noise channel differences.

* * * * *